March 5, 1968   J. S. CULLEN   3,371,825

SORPTIVE GETTER FOR PRESSURE DISCHARGE DISPENSERS

Filed May 12, 1966

INVENTOR.
John S. Cullen
BY
Popp and Sommer
ATTORNEYS

United States Patent Office 3,371,825
Patented Mar. 5, 1968

3,371,825
SORPTIVE GETTER FOR PRESSURE
DISCHARGE DISPENSERS
John S. Cullen, Buffalo, N.Y., assignor to Multiform
Desiccant Products, Inc., Buffalo, N.Y., a corporation of New York
Filed May 12, 1966, Ser. No. 549,697
1 Claim. (Cl. 222—190)

ABSTRACT OF THE DISCLOSURE

Trace water, and acids resulting therefrom, have plagued products in pressurized cans having a discharge dip tube leading from the bottom of the can to a manual discharge valve on the top head. To meet this problem a sorptive getter is attached to the bottom inlet end of the dip tube where not only it is immersed in the liquid and fully active to the end of use, but it is also immediately active against trace moisture diffusing back down through the dip tube as a consequence of operation and use.

---

Figure 1:
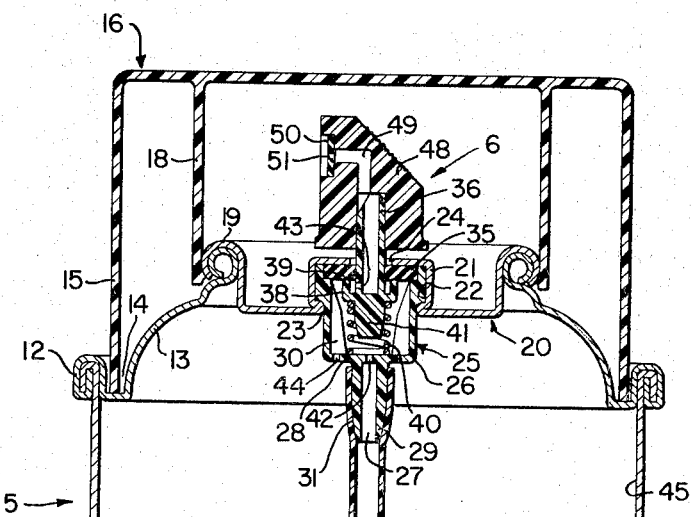

This invention relates to a sorptive getter in a pressure discharge or so-called aerosol container, the getter functioning to remove foreign fluids from the fluid product and/or propellant such as might result in propellant breakdown or product decomposition. The effect of the getter is to improve shelf life and product stability for such sensitive cosmetics as colognes, perfumes, anti-perspirants, sun tan preparations, sachets, powders and the like and also to provide excellent long-term stability for aerosol packaged pharmaceuticals of wide variety from throat sprays to anesthetics.

The propellants used with these products are generally of the halogenated hydrocarbon variety, for example Freon or dichloro-difluoromethane. Other propellants which can be used are carbon dioxide or liquefied petroleum gas. However these last propellants are not commonly used for the products mentioned above.

The halogenated hydrocarbon products are primarily in the liquid state while under pressure in the container. As such they are in contact with the product and often are mixed intimately with the product.

Water, and the acids formed by the contact of water with the product or propellant, are undesired contaminants or foreign fluids which the present sorptive getter is designed to remove from the environment. Trace moisture can precipitate the chemical breakdown of halogenated hydrocarbon propellants to form hydrochloric and hydrofluoric acid. Various adsorbents are used as the active components of the getter to remove trace water and trace acids and provide a substantially moisture free environment (less than 5 p.p.m.) for the product and propellant.

Trace water has been an ever-present problem of pressurized packaging of the above products. Substantial investment in time and money has been made to insure that the components used are as dry as possible. For example, the propellant is dried by the manufacturer to a stated level of less than 10 p.p.m. Notwithstanding, trace water does get into the pressurized container as follows:

(1) Trace water is carried in with the propellant during filling and handling at the point of packaging.

(2) Trace moisture is often adsorbed on the inside surface of the container.

(3) Trace moisture is often adsorbed in the plastic discharge valve and dip tube components of the dispenser.

(4) Trace moisture is often entrained in the product itself.

(5) Trace moisture from the atmosphere may gain entry to the container during filling and sealing.

(6) Trace moisture can back diffuse into the container during its operation and use.

(7) When alcohols are used as a vehicle for the product, water is often present in dissolved or azeotropic form in which form it can react with the product or propellant.

The problem is particularly acute with pressurized antiperspirant products. Here the product, per se, will react with any water present to form hydrochloric acid. The hydrochloric acid so formed not only has a deleterious effect on the product but will corrode the container. Side effects of the corrosion are that the corrosion may plug the dip tube or valve mechanism.

One of the principal objects of the invention is to provide a simple, fully effective, low cost getter in such pressure discharge dispensers which will add little to the cost and remove trace water or other deleterious foreign fluid thereby to eliminate costly processing to avoid such trace moisture as well as to counteract moisture coming from any of the above sources.

Another object is to provide such a getter which is firmly attached and cannot be broken up by impact so as to produce pieces which might plug the dip tube or valve mechanism.

Another object is to provide such a getter which is held at the bottom of the container so that it will be immersed or in contact with the product at any level of use and will be in contact with the liquid phase of the propellant when the product and propellant are in normal condition for storage or use.

Another object is to provide such a getter which is located immediately adjacent the outlet passage from the container so that trace moisture diffusing back into the container during its operation and use will immediately pass into the zone of operation of the getter.

Another object is to provide such a getter which can be attached by standard packaging machines.

Figure 2:
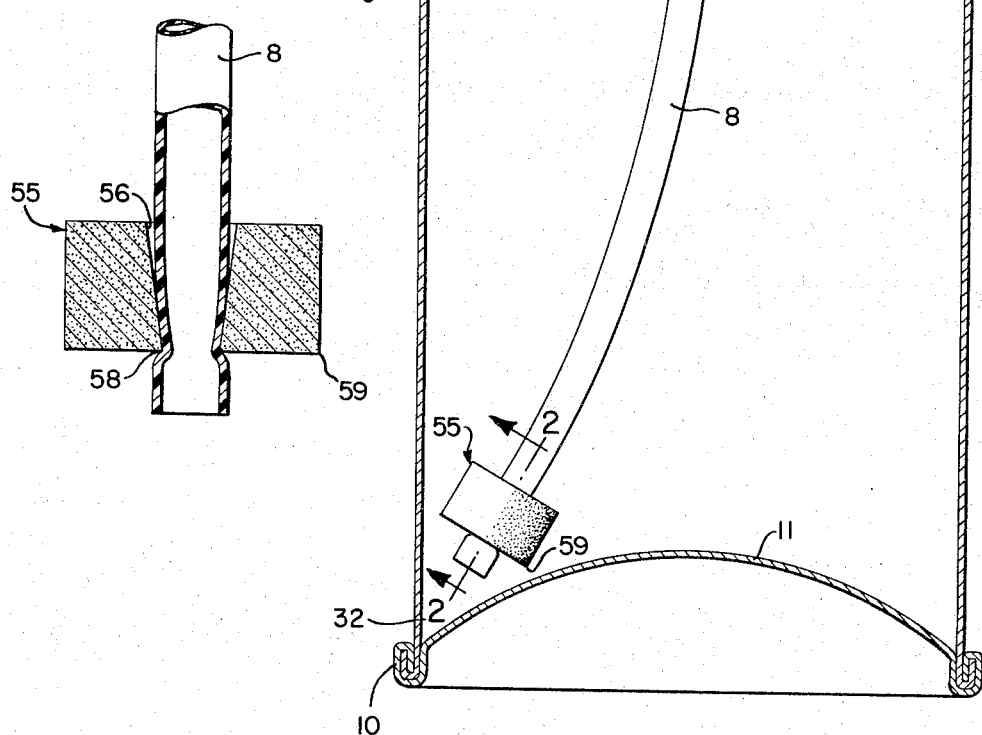

In the accompanying drawings, FIG. 1 is an enlarged vertical central section through a conventional pressurized discharge dispenser with a getter attached in accordance with the present invention. FIG. 2 is a further enlarged fragmentary vertical section taken generally on line 2—2, FIG. 1, the angular relation and distortion being exaggerated for the purpose of illustration.

The invention is illustrated in conjunction with a conventional pressure discharge dispenser having a container or can 5 with a manually operable valve 6 at its top through which the product is discharged from the bottom of the can via a dip tube 8 having its upper end connected to form an inlet to the valve 6 and its lower open inlet end arranged adjacent the bottom of the container 5.

The container 5 has a sheet metal cylindrical body or shell 9 having its lower end connected by a seam 10 to a sheet metal bottom end head 11 and having its upper end connected by a seam 12 to a sheet metal upper end head 13. Adjacent the seam 10 the upper end head 13 is shown as being formed to provide a deep annular channel 14 to receive the deep annular depending rim 15 of a removable cap 16 which can be made of an organic plastic. This cap is also shown as having a concentric internal annular depending flange 18 which fits against a bead 19 connecting the upper end head 13 with a sheet metal cover 20. This cover has an integral upright cylindrical concentric dome 21 forming a chamber 22 having a bottom opening 23 which is smaller than the internal diameter of the chamber 22 and having a still smaller top opening 24. This chamber holds a cup-shaped valve body 25 which fits the interior thereof and which has a portion 26 of smaller diameter projecting downwardly through the opening 23 and having a bottom wall 28 from which a tubular nipple 29 projects downwardly. The upper end of this nipple 29 communicates with the interior 30 of the valve body 25 via an orifice 27 and the exterior of the open lower end of the tubular nipple 29 is in the form of a downwardly diminishing taper 31 to frictionally hold the upper end of a dip tube 8 which is preferably made to an organic plastic and press fitted thereon. The lower open inlet end of this dip tube 8 extends to the annular crevice or groove 32 provided by the upwardly dished bottom end head 11 and preferably at that side of the can toward which the valve 6 discharges.

The valve seat is in the form of a manually resilient washer 35 caught between the top wall of the chamber 22 and the upper rim of the valve body 25 and carrying an upright tubular stem 36 the lower end of which is closed by an integral cup-shaped valve head 38 the upwardly projecting rim 39 of which is pressed against the under side of the valve seat washer 35 by a helical compression spring 40 seated on the bottom 28 of the valve body 25, and held centered by a depending nib 41 of the cup-shaped valve head 38. An orifice 42 provides communication between the interior of the inlet nipple 29 and the valve chamber 30; an orifice 43 provides communication between the inside of the cup-shaped valve head 38 and the interior of the stem 36; and an additional orifice 44 can be provided between the interior 45 of the container 5 and the valve chamber 30.

The valve 6 is actuated by a fingerpiece 48 fitted on the upper end of the stem 36 and having a discharge passage 49 from the stem discharging horizontally in the direction toward which the dip tube 8 leans or bends so as to get the maximum amount of the product from the can in the normal final use of tilting the can in the direction of discharge. A disk 50 in the outlet end of the discharge passage 49 provides a discharge orifice 51.

The present invention is directed to the provision of a sorptive getter 55 for such a valved pressure container. The getter is preferably in the form of a small cylinder having a through bore 56 which is frusto-conical or tapered, say to ¼°, and at least the smaller end of this bore is slightly smaller than the external diameter of the dip tube 8 so that when the getter is press fitted over the lower end of the dip tube, it deforms the latter to have a reliable grip thereon, this deformation being in the form of an annular constriction or wasp-waist 58. Both the degree of taper of the bore 56 and the degree of deformation of the construction 58 are illustrated in exaggerated form.

The getter 55 has high strength to eliminate breakage and loss during shipment. It has attrition resistant edges 59 to inhibit contamination of the product or fouling up of any of the small orifices or valve seat. The getter and its mount will withstand all prescribed acceleration, shock, drop and vibration tests.

To this end the getter is a preform composed of a material which is sorptive of the foreign fluid, and a binder. The binder preferably is an inorganic material such as clay, silicate, or a low melting glass frit, and must be sufficiently porous to permit contact between the contained sorptive material and the product and/or propellant in the container 5. An organic binder, such as those of the phenol type can also be used.

The sorptive material commonly used is a crystalline adsorbent, the crystalline structure of which is cubic and depending on their type can selectively adsorb molecules of 3 to 13 angstroms in diameter. The composition of such crystals can be generally described as sodium alumino or calcium almino silicate having the general chemical formula $M_nO \cdot Al_2O_3 \cdot SiO_2 \cdot H_2O$, where M is the metal ion.

Other adsorbents which can be used alone or with the above are aluminum oxide ($Al_2O_3$); silica gel ($SiO_2Gel$); calcium oxide (CaO); calcium sulfate ($CaSO_4$) and calcium chloride ($CaCl_2$).

Activated charcoal can be additionally used for scavenging mercaptans and other sulfur bearing compounds in the propellant.

Also certain materials, such as barium oxide (BaO), act as good moisture getters by reacting chemically with water.

It will be seen that getter 55 is effective in providing a low cost substitute for careful processing to avoid the presence of water and other trace contaminants and resultant breakdown of the product or propellant. Also by the location of the getter 55 at the inlet end of the dip tube at the bottom of the container 5 to that side toward which the product is discharged horizontally, the greater is fully effective upon filling, during shipment and while on the shelf, particularly where the propellant is initially in liquid phase; it is immersed or at least in contact with the product until the container 5 is fully drained; the product and propellant are brought into intimate contact with the getter before entering the dip tube the inlet velocity, together with sudden starting and stopping sets up a turbulence at the inlet of the dip tube to insure intimate contact with the getter as a function of its use and any back up of moisture through the dip tube in use is initially greeted by the getter.

What is claimed is:
1. In a pressure dispenser for discharging a fluid product and having a hollow pressure-tight container having upper and lower end heads connected by a tubular shell, discharge valve means for the contained fluid product mounted across an opening in said upper end head of said container, and a dip tube in said container connected to form the inlet to said valve means with its lower inlet end open and arranged adjacent the bottom end head of the container whereby a pressurized propellant in the container will serve to expel substantially all said fluid product through said dip tube and discharge valve means upon opening the latter; the combination therewith of a sorptive getter for removing from said fluid product and propellant foreign fluids which can result in propellant breakdown or product decomposition, comprising a body attached to said lower inlet open end of said dip tube to be immersed in the fluid product until substantially all of the fluid product has been discharged from the container and comprising a binder holding together a material which is sorptive of said foreign fluid, said body is in the form of a ring having a through bore, said bore having a frusto-conical form with its maximum diameter less than the original outside diameter of said dip tube.

References Cited
UNITED STATES PATENTS

| | | | |
|---|---|---|---|
| 822,638 | 6/1906 | Vester | 222—190 |
| 1,655,248 | 1/1928 | Sharp | 222—190 |
| 2,492,830 | 12/1949 | Bannister | 222—190 |
| 2,954,935 | 10/1960 | Stearns et al. | 222—190 |
| 3,049,271 | 8/1962 | Whitmore | 222—402.24 |

WALTER SOBIN, *Primary Examiner.*